United States Patent [19]
Barényi et al.

[11] 3,904,237
[45] Sept. 9, 1975

[54] BUMPER ARRANGEMENT OF A MOTOR VEHICLE

[75] Inventors: Béla Barényi, Maichingen; Karl Wilfert, Gerlingen-Waldstadt; Hermann Renner, Magstadt, all of Germany

[73] Assignee: Daimler-Benz Aktiengesellschaft, Germany

[22] Filed: Mar. 9, 1973

[21] Appl. No.: 339,832

[30] Foreign Application Priority Data
Mar. 10, 1972  Germany.......................... 2211560

[52] U.S. Cl................ 296/28 F; 280/106; 293/63; 296/35 B
[51] Int. Cl........................................... B62d 25/20
[58] Field of Search........ 296/28, 35 B; 293/63, 64, 293/70, 80, 85, 86, 87, 19; 280/106

[56] References Cited
UNITED STATES PATENTS

| | | |
|---|---|---|
| 2,102,120 | 12/1937 | Hevenor ............................ 293/63 |
| 2,517,860 | 8/1950 | Forgy................................. 293/63 |
| 2,551,528 | 5/1951 | Darrin................................ 296/28 |
| 2,959,251 | 11/1960 | Landman et al..................... 293/86 |
| 3,008,746 | 11/1961 | Senger................................ 293/70 |
| 3,131,963 | 5/1964 | Schilberg........................... 296/28 |
| 3,603,633 | 9/1971 | Eshelman........................... 293/19 |

FOREIGN PATENTS OR APPLICATIONS
892,554  10/1953  Germany .......................... 280/106

*Primary Examiner*—Robert J. Spar
*Assistant Examiner*—Ross Weaver
*Attorney, Agent, or Firm*—Craig & Antonelli

[57] ABSTRACT

An arrangement of a bumper system at the support structure of a vehicle, especially of a passenger motor vehicle, which includes a bumper that is retained at the support structure by shock absorbers whose axes rise in the direction toward the bumper.

19 Claims, 6 Drawing Figures

FIG. 3
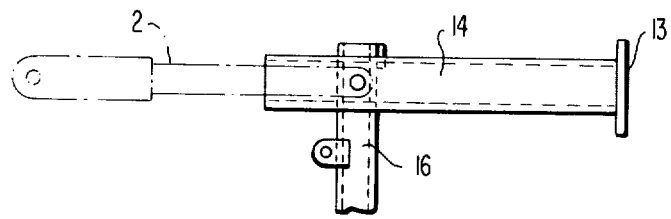
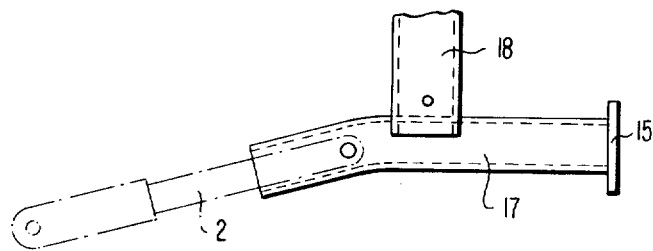
FIG. 4
FIG. 5
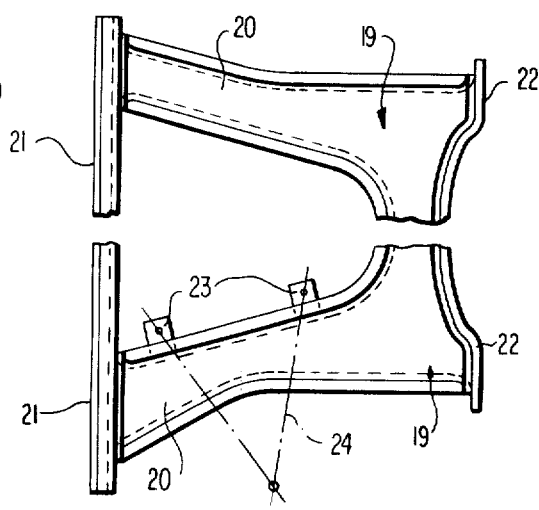
FIG. 6

BUMPER ARRANGEMENT OF A MOTOR VEHICLE

The present invention relates to the arrangement of a bumper installation at the support structure of a vehicle, especially of a passenger motor vehicle, which includes a bumper that is retained by means of shock absorbers.

With such an arrangement, the bumper is constructed as form-rigid as possible, whereas the kinetic energy produced during an accident of the vehicle is to be dissipated by the shock absorbers as completely as possible at low velocities and is to be dissipated by the shock absorbers at least to a large extent at high velocities. Simultaneously, the support structure is to be constructed within the area of the vehicle passenger space as form-rigid as possible so that the vehicle passengers are accommodated in a space which does not or only slightly deforms in case of an accident.

With known prior art arrangements, the shock absorbers are arranged in horizontal planes. In case of an accident they transmit still relatively high forces which have to be absorbed by the support structure such as the frame, self-supporting body structure, etc. These forces are introduced relatively high into the support structure so that they act as bending moments on the lower area of the support structure and especially on the vehicle floor. In order to be able to withstand these stresses or loads, the support structure has to be dimensioned very sturdy within this area.

The present invention is concerned with the task to provide an arrangement of the aforementioned type in which the forces absorbed by the shock absorbers can be introduced safely into the remaining support structure. The present invention essentially consists in that the axes of the shock absorbers rise in the direction toward the bumper. It is achieved in this manner that the introduced forces are directed toward the area of the support structure forming the floor of the passenger space, which as a rule is dimensioned already relatively strong and sturdy and which can be further reinforced with relatively slight additional manufacturing expenditures.

In one advantageous embodiment of the present invention, provision is made that the floor sheet metal plate of the vehicle extends at an inclination in extension of the axes of the shock absorbers. As a result thereof, the force introduction into the vehicle floor is still further improved.

It is advantageous for the function of the shock absorber installation if the axes of the shock absorbers diverge in the direction toward the bumper. It is assured thereby that the bumpers do not slightly turn on edge or "angle" in case of eccentric or inclined loads due to compression of the shock absorbers.

In a structurally advantageous embodiment of the present invention, the shock absorbers are supported in preferably tubularly shaped mounting support members which are detachably secured at the part of the support structure forming the passenger space. Relatively large shock absorbers can be accommodated in this manner without having to lengthen excessively the front area of the vehicle. It is thereby appropriate if the mounting support members are connected with each other by a detachable transverse web.

In another embodiment of the present invention, the shock absorbers are supported in a common mounting support member. It is advantageous for the manufacture if, according to a further feature of the present invention the mounting support member or members are provided with bearing supports for a wheel suspension whose axes extend parallel to the shock absorber axes of the respective vehicle side.

Accordingly, it is an object of the present invention to provide a bumper installation for a vehicle, especially a passenger motor vehicle, which avoids by simple means the aforementioned shortcomings and drawbacks encountered in the prior art.

Another object of the present invention resides in an arrangement of a bumper system of a vehicle which is able to absorb relatively large forces without any significant deformation of the support structure forming the vehicle passenger space.

A further object of the present invention resides in a bumper system for motor vehicles, especially passenger motor vehicles, which is able to absorb impacts at slow and high speeds without danger to the passengers of the vehicle.

Still another object of the present invention resides in an arrangement of a bumper of the type described above which permits the introduction of the forces into the support structure of the vehicle in a safe and reliable manner without requiring excessive additional expenditures as regards reinforcements and the like.

Another object of the present invention resides in a bumper system for passenger motor vehicles which is reliable in its operation also in case of eccentric or inclined impacts.

These and other objects, features and advantages of the present invention will become more apparent from the following description when taken in connection with the accompanying drawing which shows, for purposes of illustration only, several embodiments in accordance with the present invention, and wherein:

FIG. 3 is a partial view of a detail of one embodiment of a symmetrically constructed arrangement in accordance with the present invention;

FIG. 4 is a partial plan view of a modified embodiment of a detail of a symmetrically constructed arrangement in accordance with the present invention, similar to FIG. 3;

FIG. 5 is a partial plan view on a still further modified embodiment of a detail of a symmetrically constructed arrangement in accordance with the present invention; and FIG. 6 is a partial plan view on a further modified embodiment of a detail of a symmetrically constructed arrangement in accordance with the present invention, similar to FIG. 5.

Figure 1:
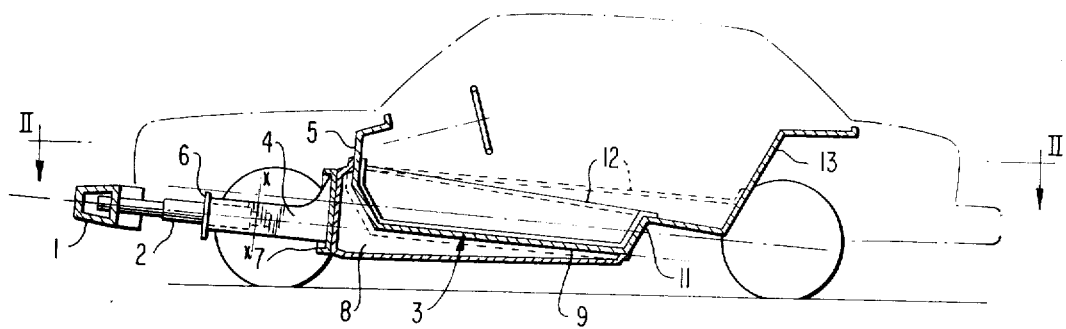
FIG. 1 is a schematic longitudinal cross-sectional view through a motor vehicle equipped with an arrangement of a bumper system in accordance with the present invention.
Figure 2:
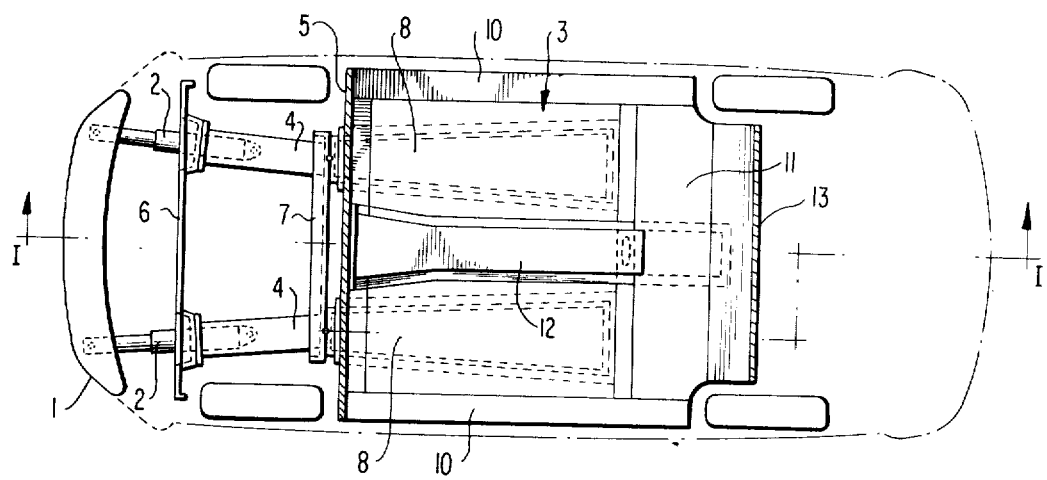
FIG. 2 is a plan view on the arrangement in accordance with the present invention as shown in FIG. 1.

Referring now to the drawing wherein like reference numerals are used throughout the various views to designate like parts, and more particularly to FIGS. 1 and 2, the passenger motor vehicle illustrated in these figures is equipped in its front area with a form-rigid bumper 1 which is connected by way of two shock absorbers 2 of conventional construction with a support structure generally designated by reference numeral 3 of the vehicle. The two shock absorbers 2 are each pivotally supported in a tubularly shaped mounting support member 4 about a vertical axis x—x. The support members 4 are secured within the area of the forward closure wall 5 of the passenger space at the support structure 3. The support members 4 are connected with each other within the area of the forward ends by way of a cross web 6. A further cross web 7 connects the rearward ends thereof by means of which they are detachably secured at plane connecting surfaces of the support structure 3.

The connecting surfaces are constituted by two inner longitudinal bearers 8 which are constituted by sheet metal profiles that are hat-shaped in cross section; the hat-shaped sheet metal profiles thereby abut at the floor plate 9 of the vehicle from below by means of flanges.

The support structure 3 therebeyond includes within the area of the passenger space two outer longitudinal bearers 10 disposed in the wheel track, a cross bearer 11 extending underneath the rear seats (not shown) as well as a tunnel-like longitudinal bearer 12 disposed in the vehicle center which extends from the forward closure wall 5 to the rear cross bearer 11 or to the rear closure wall 13. This longitudinal bearer 12 forms a tunnel for the accommodation of a cardan shaft which connects the driving engine with the driven rear axle.

In order to be able to introduce forces which are to be transmitted in case of an accident from the shock absorber 2 to the support structure 3, well into the support structure 3, the shock absorbers 2 are so arranged that the axes thereof rise from the support structure 3 in the direction toward the bumper 1. It is achieved thereby that the support which takes place within the area of the forward end of the vehicle passenger space, is located approximately in the floor structure of the vehicle. This favorable force introduction is further enhanced in that the sheet metal floor plate 9 is provided with the same inclination so that it extends in extension of the axes of the shock absorbers 2. As a result of this rising construction of the floor plate 9, a space is created for the longitudinal bearers 8 which extend from the forward closure wall 5 to the rear cross bearer 11 whereby they taper continuously and represent such types of bearers of same rigidity.

The shock absorbers 2 are additionally so arranged that their axes diverge or spread apart in the direction toward the bumper 1 as viewed in plan view so that their distance between the bearers 8 is smaller than their distance at the pivotal connecting places of the bumper 1. It is achieved by this inclined or diverging arrangement of the shock absorbers that also in case of impact directions deviating for the most part from the longitudinal axis of the vehicle the bumper "angles off" less than with a parallel arrangement.

A support member 14 is illustrated in FIG. 3 which receives the piston rod of a shock absorber 2 illustrated in dash and dot lines. This mounting support 14 consists of a tubular member that is provided at its end facing the support structure with an annular flange 13 by means of which it can be bolted to a plane abutment surface of the support structure. A cross web 16 leads from the mounting support member 14 to the corresponding mounting support member (not shown) of the opposite vehicle side which cross web 16 is mounted in the forward area of the support member 14.

The embodiment according to FIG. 4 corresponds essentially to the embodiment of FIG. 3 as also in this case a tubular member is provided as mounting support member 17 which is provided with an annular flange 15 for the fastening at the support structure. The tubular member is angularly bent off toward the outside within the area of its forward end in which it receives the piston rod of a shock absorber 2 so that the shock absorbers 2 of the mutually opposite vehicle sides spread or diverge in the direction toward the bumper. In this embodiment, a cross web 18 engages at the area of the mounting support 17 extending in the vehicle longitudinal direction which connects with each other the mutually opposite mounting supports 17 of both vehicle sides.

A further mounting support generally designated by reference numeral 19 is illustrated in FIGS. 5 and 6 which is constructed as a unitary structural part that simultaneously receives or accommodates the shock absorbers of the two mutually opposite sides of the vehicle. This support member 19 includes an approximately pants-like configuration whereby its two legs 20 diverge obliquely forwardly. They are additionally connected at their forward end by means of a cross web 21. Within the area of the common rear end, a circumferential flange 22 is provided which forms on both sides in the outer area flat abutment surfaces and is drawn-in within the central area. This embodiment is suited in particular for the accommodation of the front wheel suspension of the vehicle. For example, FIG. 6 illustrates a construction according to which two bearing supports 23 of a lower triangular guide member 24 of a front wheel suspension is mounted at the leg 20 of the mounting support 19. It is thereby advantageous for structural reasons if the axes of the bearing supports 23 extend parallel to the axes of the shock absorbers 2 indicated in dash and dot lines.

The partial plan views of FIGS. 3, 4, 5, and 6 show in each case one-half of an otherwise mirror-image-like symmetrically constructed arrangement of the respective support structures.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An arrangement of a bumper installation at a support structure of a vehicle having sides, which arrangement comprises:
   bumper means retained at an end portion of at least one shock absorber means, said shock absorber means having at least another end portion fixedly attached to said support structure,
   wherein the axis of each of the at least one shock absorber means rises in the direction toward the bumper means, and
   wherein the at least one shock absorber means is supported at mounting means secured at a part of the support structure forming a passenger space of the vehicle, whereby the rising of the shock absorber means in the direction of the bumper means improves absorption of deformation forces due to impact on the bumper means.

2. An arrangement of a bumper installation at a support structure of a vehicle, which comprises a bumper means that is retained by at least one shock absorber means, characterized in that the axis of each of the at least one shock absorber means rises in the direction toward the bumper means, and further characterized in that the vehicle includes a floor plate means which extends at an inclination substantially in extension of each said axis.

3. An arrangement according to claim 2, characterized in that the floor plate means is a sheet metal floor plate.

4. An arrangement according to claim 2, characterized in that the shock absorber means are plural with axes which diverge relative to one another in the direction toward the bumper means.

5. An arrangement according to claim 4, characterized in that the shock absorber means are supported in mounting means detachably secured at a part of the support structure forming a passenger space of the vehicle.

6. An arrangement according to claim 5, characterized in that the mounting means are tubularly shaped mounting support members.

7. An arrangement according to claim 5, characterized in that the mounting means are connected with each other by at least one detachable cross web.

8. An arrangement according to claim 5, characterized in that shock absorber means are provided for each vehicle side and are supported in a common mounting means.

9. An arrangement according to claim 8, characterized in that the mounting means includes support means for a wheel suspension whose axes extend substantially parallel to the shock absorber axes of the respective vehicle side.

10. An arrangement according to claim 9, characterized in that the common mounting means is of substantially pants-like configuration with the leg portions thereof diverging in the direction of the bumper means.

11. An arrangement according to claim 7, characterized in that the mounting means includes support means for a wheel suspension whose axes extend substantially parallel to the shock absorber axes of the respective vehicle side.

12. An arrangement according to claim 1, characterized in that the shock absorber means are plural with axes which diverge relative to one another in the direction toward the bumper means.

13. An arrangement according to claim 1, characterized in that the mounting means is detachably secured at said passenger space of the vehicle.

14. An arrangement according to claim 13, characterized in that the mounting means are tubularly shaped mounting support members.

15. An arrangement according to claim 13, characterized in that the mounting means are connected with each other by at least one detachable cross web.

16. An arrangement according to claim 1, characterized in that the shock absorber means are provided for each vehicle side and are supported in a common mounting means.

17. An arrangement according to claim 16, characterized in that the common mounting means is of substantially pants-like configuration with the leg portions thereof diverging in the direction of the bumper means.

18. An arrangement according to claim 16, characterized in that the mounting means includes support means for wheel suspension means with at least one axis extending substantially parallel to the shock absorber axis of the respective vehicle side.

19. An arrangement according to claim 13, characterized in that the mounting means includes support means for a wheel suspension whose axes extend substantially parallel to the shock absorber axes of the respective vehicle side.

* * * * *